US012311693B2

(12) United States Patent
Letizia

(10) Patent No.: US 12,311,693 B2
(45) Date of Patent: May 27, 2025

(54) ARTICLE PLACEHOLDER DEVICE

(71) Applicant: Vincenzo Letizia, Calgary (CA)

(72) Inventor: Vincenzo Letizia, Calgary (CA)

( * ) Notice: Subject to any disclaimer, the term of this patent is extended or adjusted under 35 U.S.C. 154(b) by 203 days.

(21) Appl. No.: 18/341,803

(22) Filed: Jun. 27, 2023

(65) Prior Publication Data

US 2024/0391272 A1 Nov. 28, 2024

Related U.S. Application Data

(63) Continuation of application No. PCT/IB2023/055369, filed on May 23, 2023.

(51) Int. Cl.
*B42F 21/00* (2006.01)
*B42F 15/00* (2006.01)

(52) U.S. Cl.
CPC .......... *B42F 21/00* (2013.01); *B42F 15/0011* (2013.01)

(58) Field of Classification Search
CPC ............................ B42F 21/00; B42F 15/0011
See application file for complete search history.

(56) References Cited

U.S. PATENT DOCUMENTS 1,558,756 A 10/1925 Rand
1,711,895 A 5/1929 Lehman et al.
1,868,276 A 7/1932 Davis
2,021,950 A 11/1935 Thomas
2,272,685 A 2/1942 Volk
2,443,522 A 6/1948 Smith
2,689,571 A 9/1954 Watkins
2,771,076 A 11/1956 Peter
2,881,766 A 4/1959 Torsjo
3,205,597 A 9/1965 Stern
3,540,140 A * 11/1970 Tourre .................. B42F 21/00 40/666
5,287,823 A 2/1994 Jiang
5,676,439 A * 10/1997 Occhipinti ............. B42F 21/00 312/193.4
6,354,027 B1 * 3/2002 Cummings ............ B42F 21/00 40/359
7,334,363 B1 * 2/2008 Hansen .................. G09F 23/10 229/67.2
7,434,343 B2 9/2008 Yoshida
7,857,127 B2 12/2010 Lau
9,061,540 B2 6/2015 Windorski et al.
9,067,455 B2 6/2015 Shofftsall-Ridley
9,296,248 B1 3/2016 Hansen
2004/0021309 A1 * 2/2004 Norenberg ............. B42F 21/00 283/36
2011/0078095 A1 * 3/2011 Eckhardt .................. B42F 7/12 206/557

(Continued)

*Primary Examiner* — Gary C Hoge
(74) *Attorney, Agent, or Firm* — Lewellyn Law, PLLC; Stephen Lewellyn

(57) ABSTRACT

A placeholder device for quickly providing a visual indication of the location of where to return a file folder from a stack of file folders. The placeholder has a first leaf, a second leaf, and a tab. The second leaf extends from the first leaf in a perpendicular direction to form an L-shape with the first leaf. The tab may be pivotal between an extended position and a generally flattened position along the second leaf. A colored emblem may be attached to the tab of the placeholder an a corresponding colored emblem may be attached to a file folder to match the file folder with the placeholder.

11 Claims, 7 Drawing Sheets

(56) References Cited

U.S. PATENT DOCUMENTS

| | | | | |
|---|---|---|---|---|
| 2011/0192120 | A1* | 8/2011 | Flynn | G09F 3/02<br>40/641 |
| 2014/0116903 | A1 | 5/2014 | Lau | |

* cited by examiner

ARTICLE PLACEHOLDER DEVICE

REFERENCE TO RELATED APPLICATIONS

This application claims the benefit of priority to PCT Application No. PCT/IB2023/055369 filed May 23, 2023, which is incorporated herein by reference in its entirety.

FIELD OF THE INVENTION

The invention relates to improvements in indexing file folders and, more particularly, to a file folder placeholder device.

BACKGROUND OF THE INVENTION

File folders are routinely used to hold and organize records and are stored on a file shelving or in the drawers of a filing cabinet. The file folders are typically organized by some index in relation to their relative position to other file folders. When there are numerous file folders stored together on a file shelving or in a drawer of a filing cabinet, it can be time-consuming to return a file folder back to its proper position within the stack of file folders. Accordingly, there is a need and a desire for a device that allows a person to quickly recognize the location of where to replace a file folder in a stack of file folders.

SUMMARY OF THE INVENTION

Embodiments of the invention described herein provide for a placeholder device that can be used to hold the position of an article removed from a stack of row of articles to allow quick replacement of the removed article.

Embodiments of the invention described herein provide for a placeholder device for quickly providing a visual indication of the location of where to return a file folder from a stack of file folders, whether the file folder stack is located along a file shelf or in a file drawer.

In aspects, an article placeholder device is provided that has a first leaf, a second leaf, and a tab. The first leaf may have a first broad planar surface, a second broad planar surface that is separated by the first broad planer surface by a first thickness, a first edge, a second edge opposite the first edge, a third edge, and a fourth edge opposite the third edge. The second leaf may have a third broad planar surface, and a fourth broad planar surface that is separated by the third planar surface by a second thickness. The second leaf may extend from the first edge of the first leaf in a direction perpendicular to the first broad surface to form an L-shape with the first leaf. The tab may have a first tab planer surface, a second tab planer surface opposite the first tab planer surface. The tab may be pivotally attached to first leaf or to the second leaf such that the tab pivots between a first position wherein the tab extends in a direction that is perpendicular to the second leaf and a second position wherein the tab extends in a direction that is parallel to the second leaf.

Numerous additional objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there are illustrated embodiments of the invention.

BRIEF DESCRIPTION OF THE DRAWINGS

The following drawings illustrate by way of example and are included to provide a further understanding of the invention for the purpose of illustrative discussion of the embodiments of the invention. No attempt is made to show structural details of the embodiments in more detail than is necessary for a fundamental understanding of the invention, the description taken with the drawings making apparent to those skilled in the art how the several forms of the invention may be embodied in practice. Identical reference numerals do not necessarily indicate an identical structure. Rather, the same reference numeral may be used to indicate a similar feature or a feature with similar functionality. In the drawings.

DETAILED DESCRIPTION

Figure 1:
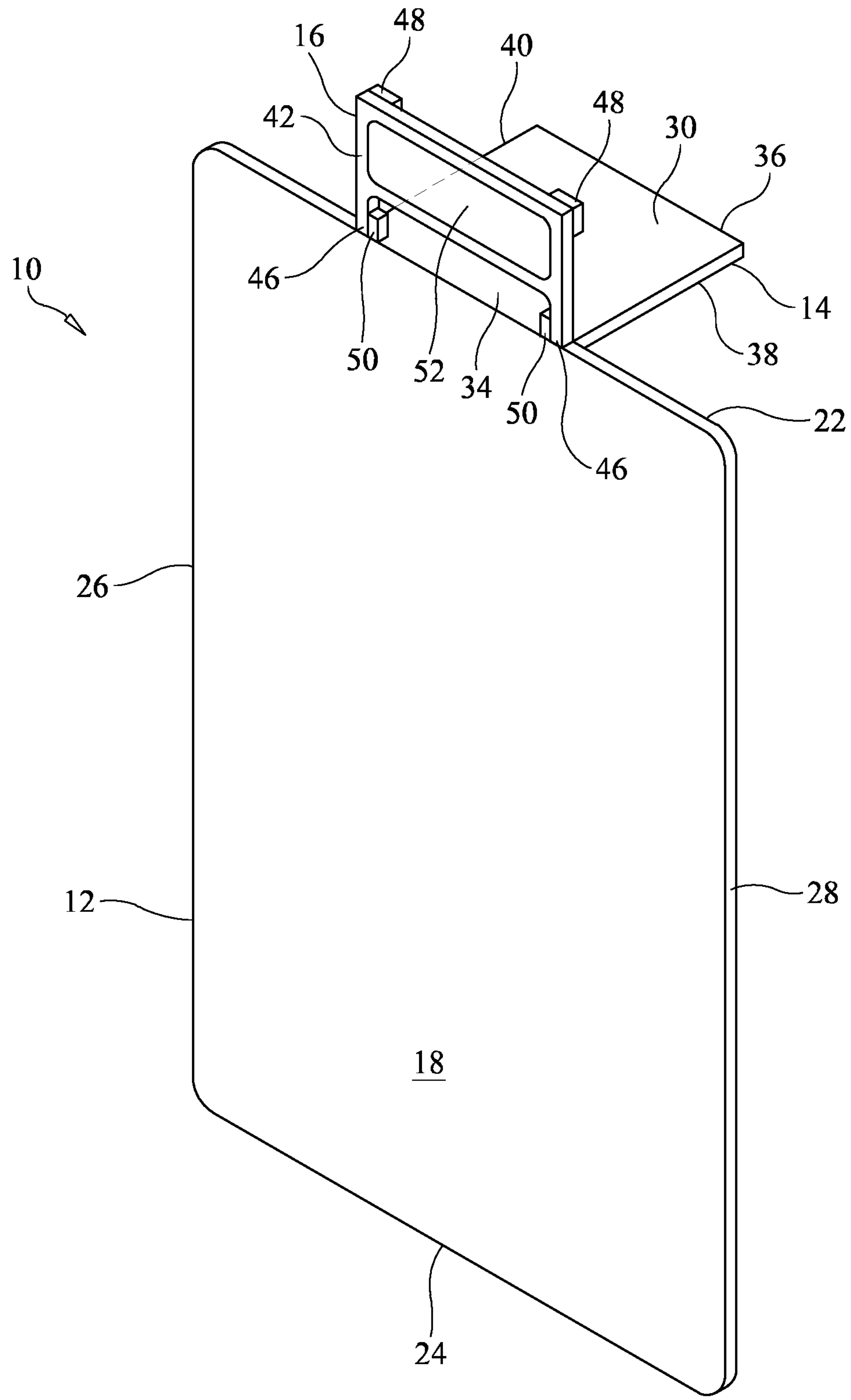
FIG. 1 is a first perspective view of an article placeholder device shown in accordance with an embodiment of the invention.
Figure 2:
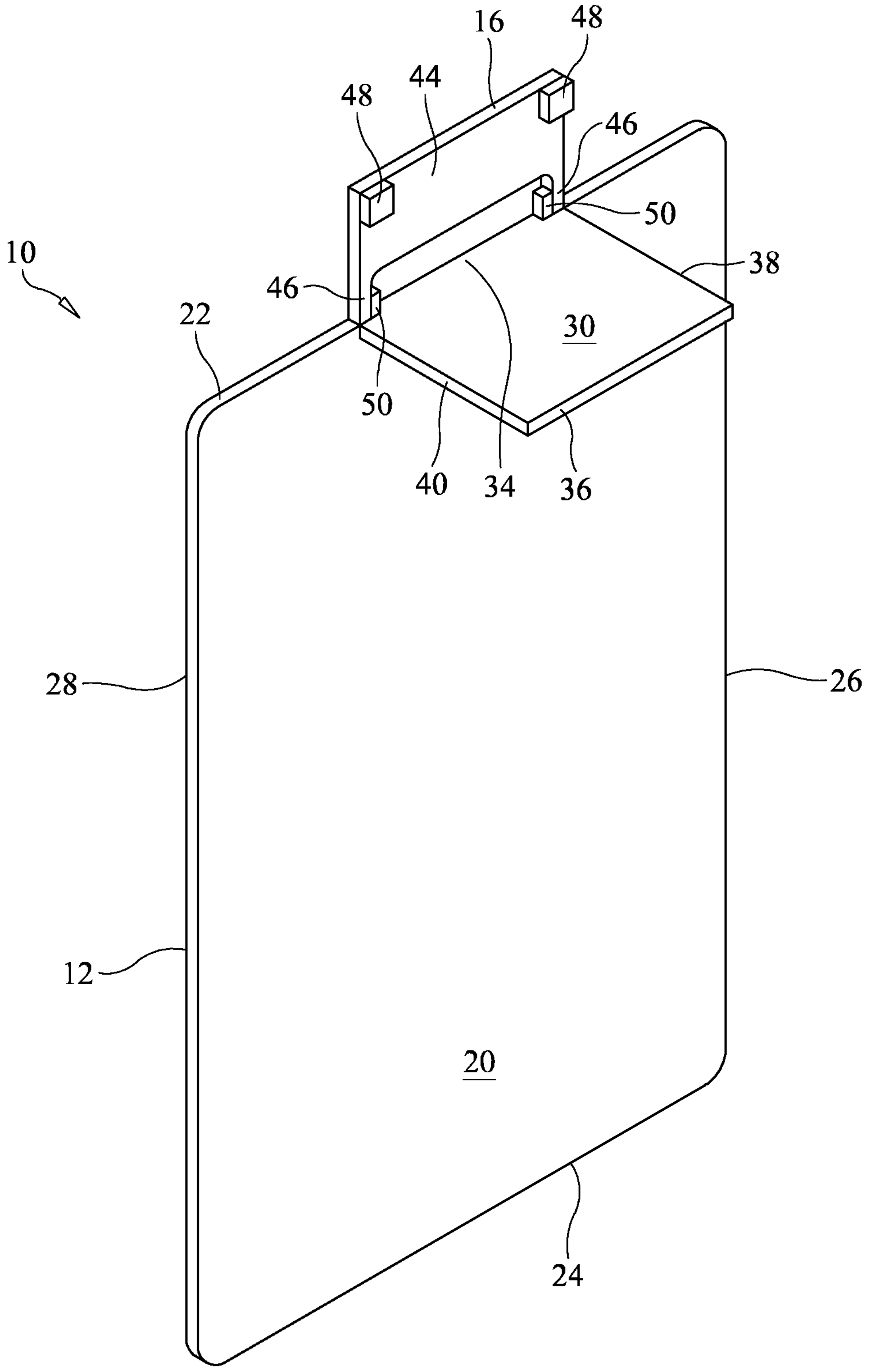
FIG. 2 is a second perspective view of an article placeholder device shown in accordance with an embodiment of the invention.
Figure 3:
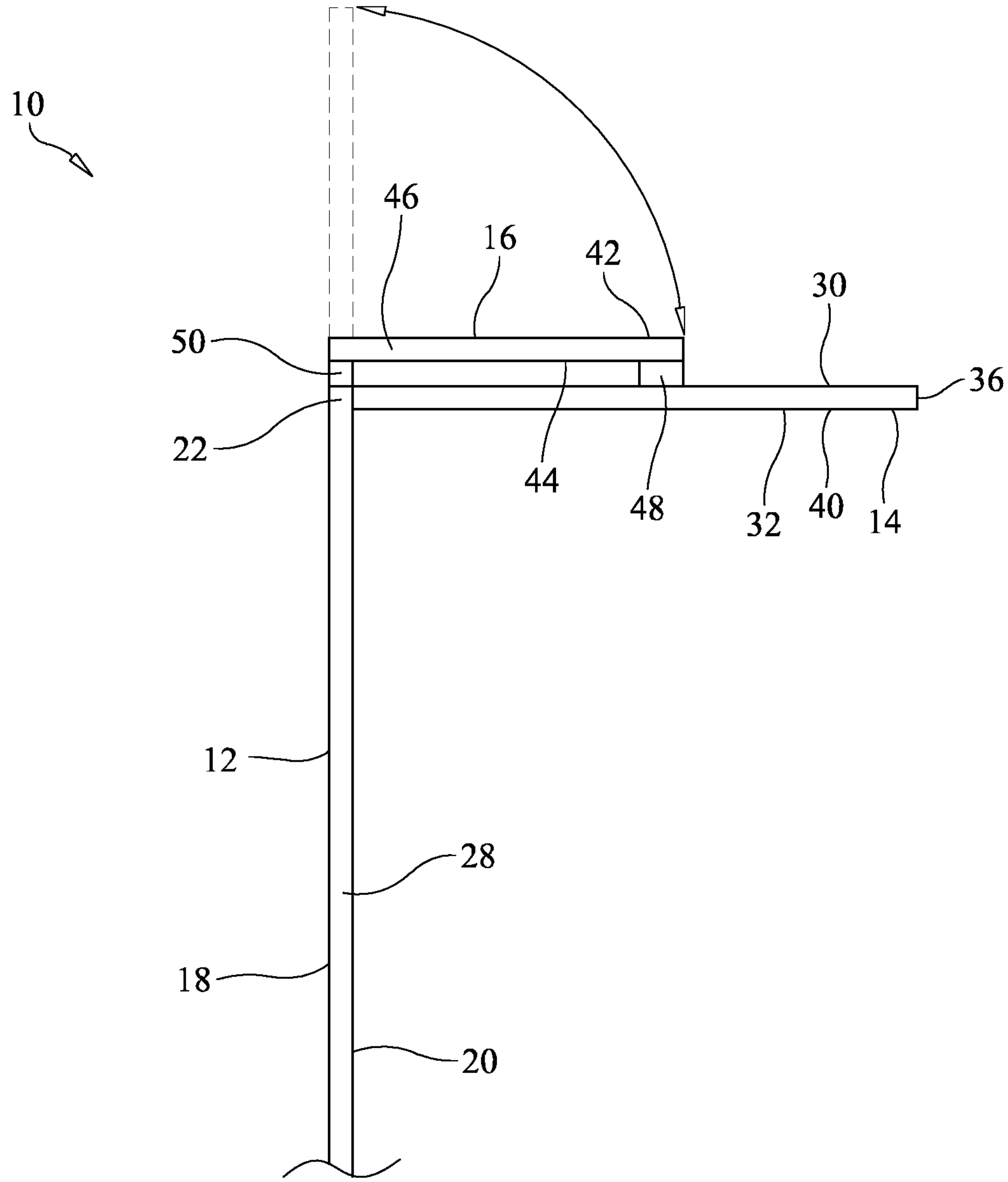
FIG. 3 is partial side view of an article placeholder device shown in accordance with an embodiment of the invention.
Figure 4:
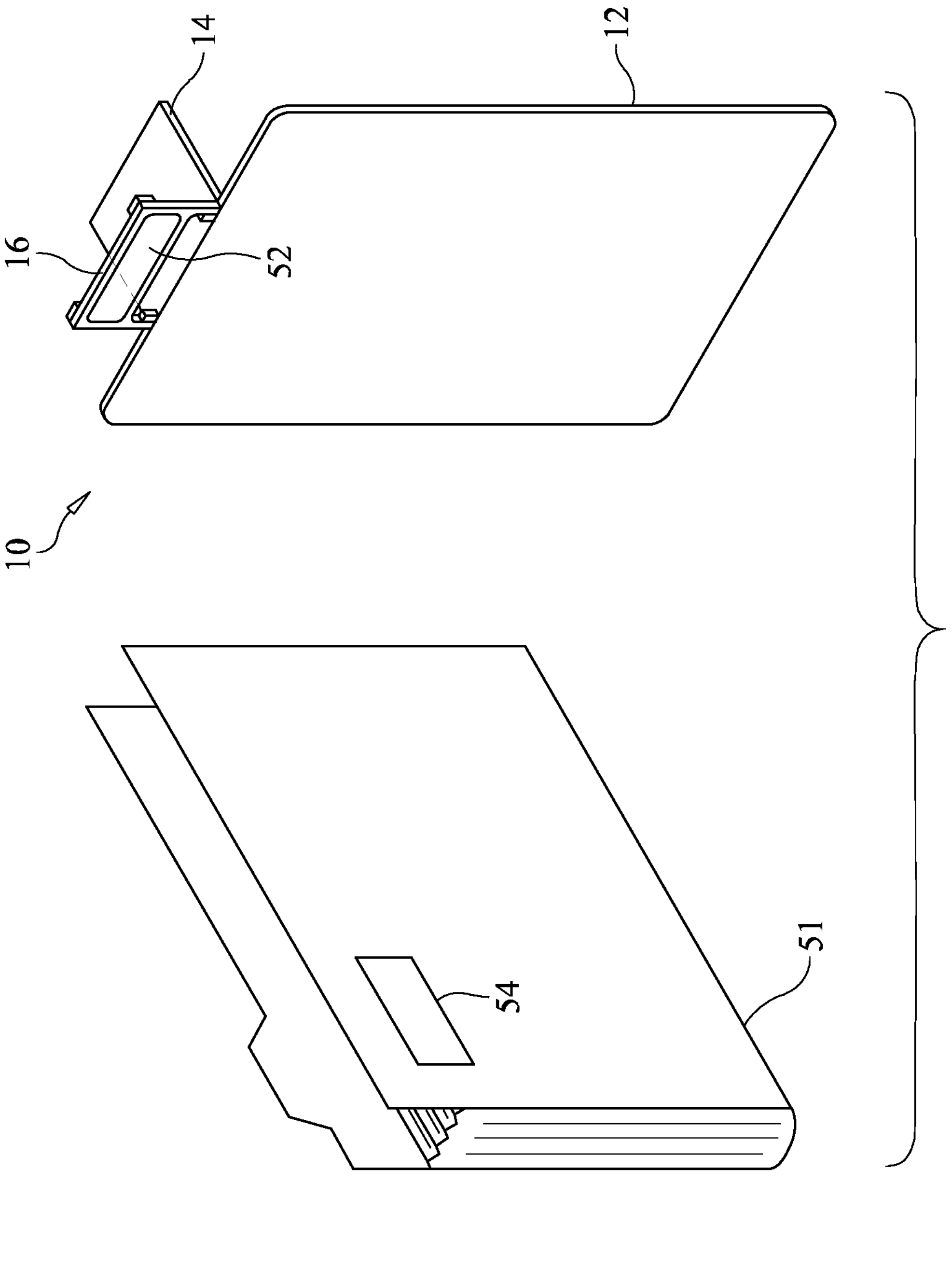
FIG. 4 is a diagrammatic view of an article placeholder device shown in accordance with an embodiment of the invention.

The following detailed description of embodiments of the invention references the accompanying drawings. The embodiments are intended to describe aspects of the invention in sufficient detail to enable those skilled in the art to practice the invention. Other embodiments can be utilized, and changes can be made without departing from the scope of the disclosure.

In FIGS. 1-4 of the drawings, there is illustrated an article placeholder device 10 in accordance with an embodiment of the invention. Placeholder 10 is particularly useful for quickly providing a visual indication of the location of where to return a file folder from a stack of file folders, whether the file folder stack is located along a file shelf or in a file drawer. For example, when a file folder is removed, placeholder 10 can be inserted in the place where the file folder was located to serve as a placeholder for the removed file for the later replacement of the file. The configuration of placeholder 10 allows for it to be easily inserted in the place of the removed file and then quickly seen to allow replacement of the file fold in its original location.

In the representatively illustrated embodiment, placeholder 10 has a first leaf 12, a second leaf 14, and a pivoting tab 16. The first leaf 12 can be rectangular-shaped and can have opposite broad planar surfaces 18 and 20 that are separated by a thickness, opposite first and second edges 22 and 24, and opposite third and fourth edges 26 and 28. In aspects, the first leaf can be about 7.5 inches long and about 4.5 inches wide. In aspects, the first and second edges are along the leaf's width and the third and fourth edges are along the leaf's length.

The second leaf 14 can be square-shaped and can have opposite broad planar surfaces 30 and 32 that are separated by the thickness of the leaf, opposite first and second edges 34 and 36, and opposite third and fourth edges 38 and 40. The second leaf 14 is attached at its edge 34 to edge 22 of the first leaf and extends therefrom in a direction that is perpendicular to surface 18 such that the first and second leaves form an L-shape. In aspects, the second leaf can be about 2.25 inches long and about 2.25 inches wide.

Tab 16 can be rectangular-shaped and can have opposite broad planar tab surfaces 42 and 44, a pair of spaced legs 46 one located at opposite ends 46 and 48 of the tab, and a pair of stand-offs 48 disposed on tab planer surface 44 and at the opposite ends. In aspects, tab 16 can be pivotally attached to edge 22 of the first leaf 12 by a pivotal connection 50 at each leg thereof such that the tab is able to pivot between first and second positions. In the first position, tab 16 extends from edge 22 in a direction that is perpendicular to the second leaf 14. In the second position, tab 16 extends from edge 22 in a direction that is parallel to the second leaf 14. In the second position, the pair of stand-offs 48 may contact the surface 30 of the second leaf 14 to provide a space between the tab and the second leaf to allow a person's finger to grip the tab and pivot it into the first position more easily.

The pivotal connection of tab 16 is important because it allows the tab to move from an extended position into a generally flattened position along the second leaf 14 so that it does not interfere with the closing of a file drawer in which the placeholder 10 is inserted. In aspects, tab 16 can be weighted to cause it to pivot under the force of gravity into the second, flattened position from the first, extended position. Additionally, tab 16 may be used as a handle to allow a user to grasp the placeholder more easily and pull it from a stack of files.

In aspects, a system may be provided that includes more than one placeholder 10, which can be used simultaneously, each for a corresponding file folder. Color coding can be used to match a file folder with a corresponding placeholder to ensure the folder is exchanged with the correct placeholder when returning the folder. In aspects, the color coding may include each placeholder having a different colored emblem 52 and the folders having a colored emblem 54 corresponding to the color of the placeholder emblem. In aspects, the placeholder emblem 52 may be adhesively attached to tab 16. In aspects, the placeholder emblem 52 may be adhesively attached to surface 42 of tab 16. In aspects, the colored folder emblem 54 may be adhesively attached to the folder. The color of the folder emblem 54 can easily be changed by simply attaching a folder emblem having a different color over an existing emblem to correspond to the color of a placeholder emblem 52. In this manner, one or more placeholders 10 can be used over and over with different file folders.

Figure 5:
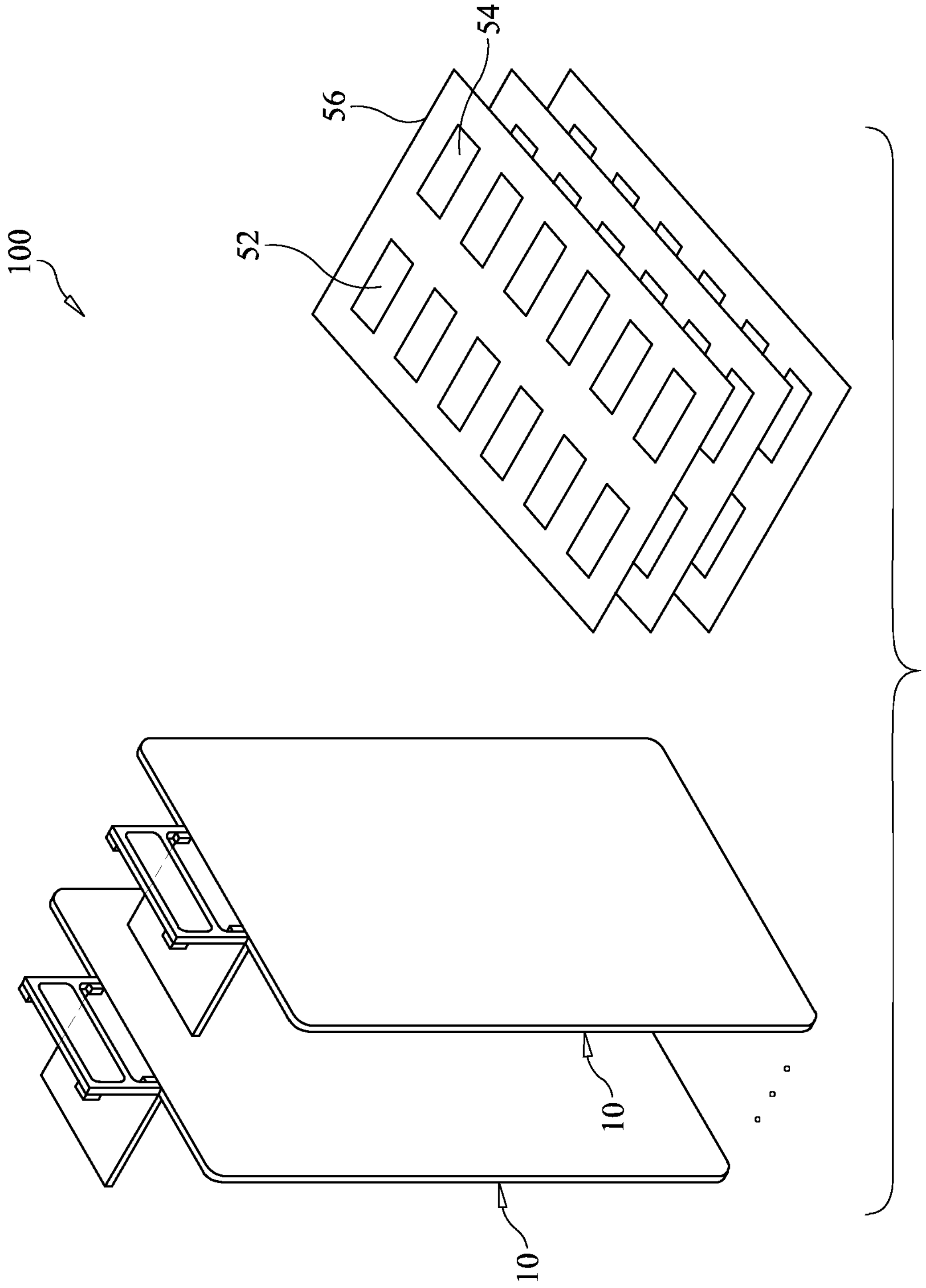
FIG. 5 is a diagrammatic view of an article placeholder device system shown in accordance with an embodiment of the invention.

In FIG. 5, a kit or system 100 is illustrated, wherein the system includes at least two placeholders 10 and a plurality of sheets 56 of adhesive emblem 52, 54, each of different colors emblems. Different colored emblems 52 can be attached to the different placeholders 10, and the remaining colored emblems can be used as folder emblems 54 for attachment to file folders for color coding.

Figure 6:
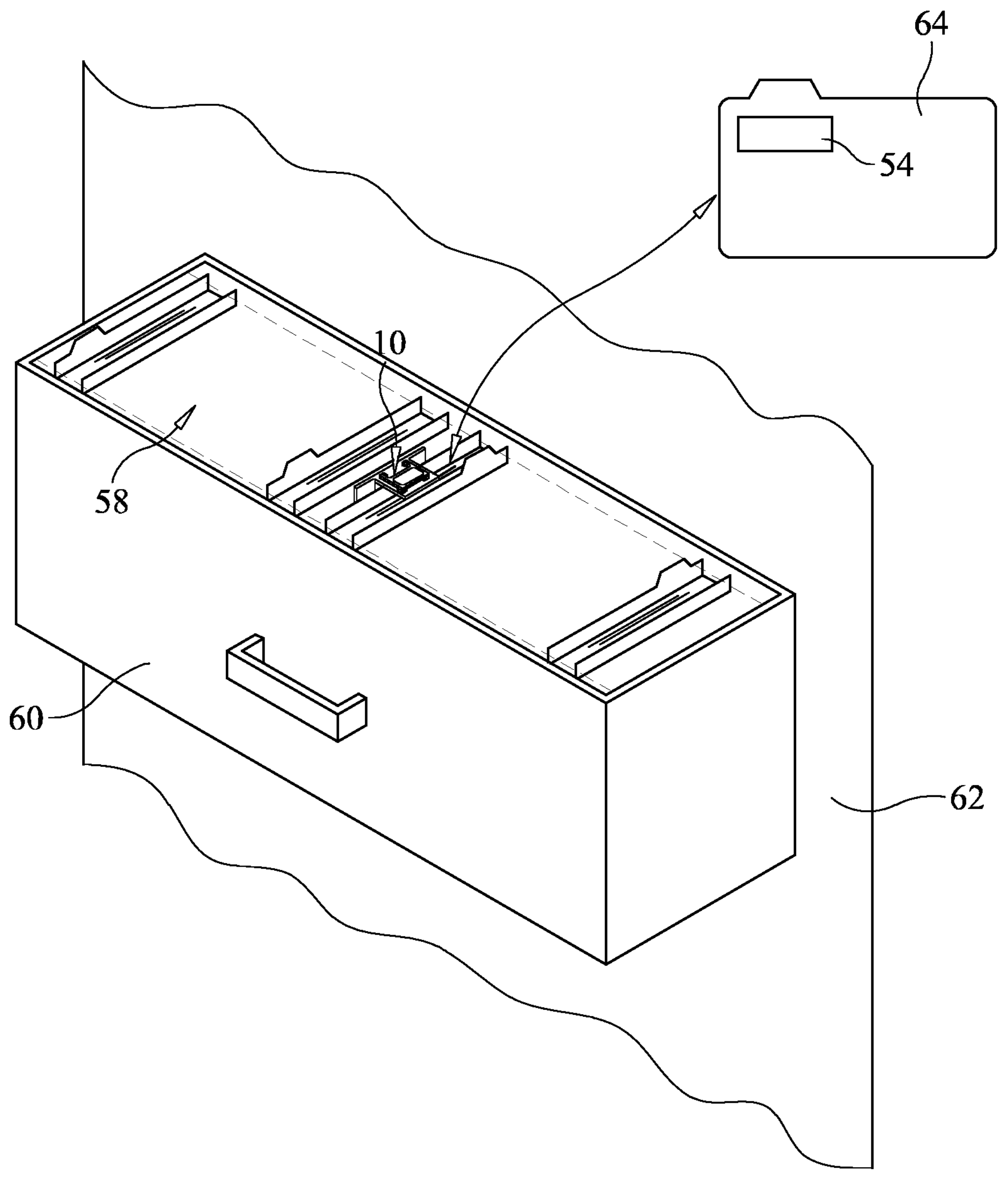
FIG. 6 is a diagrammatic view of an article placeholder device in use in connection with a file drawer with file folders.

In FIG. 6, a placeholder 10 is shown in use inserted into a stack of files 58 located in a file drawer 60 of a filing cabinet 62. Further shown, is a representation of a file folder 64 corresponding to placeholder 10 which is being used to indicate the position of the folder in the file drawer.

Figure 7:
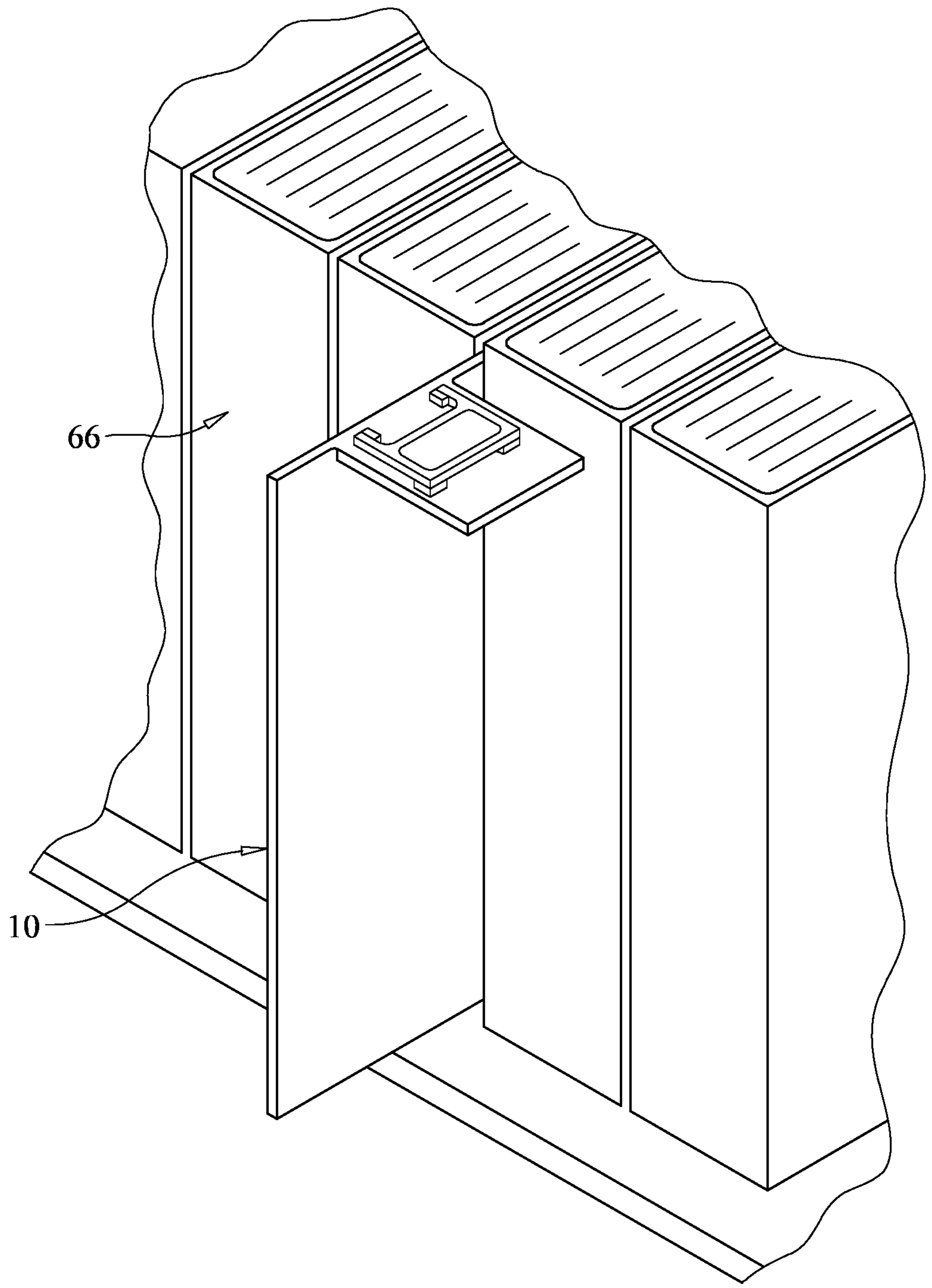
FIG. 7 is a diagrammatic view of an article placeholder device in use in connection with books on a bookshelf.

While the foregoing discussion is made in connection with placeholder 10 being used to hold the position of a file folder. Placeholder 10 can be used as a placeholder for numerous types of articles and is not limited to only file folders. For example, in FIG. 7, placeholder 10 is shown in use inserted into a stack (row) of books 66 to indicate the position of a book that has been removed from the books.

It will be appreciated by persons skilled in the art that the present embodiment is not limited to what has been particularly shown and described hereinabove. A variety of modifications and variations are possible in light of the above teachings without departing from the scope of the disclosure.

What is claimed is:

1. An article placeholder device, comprising:

a first leaf, the first leaf having a first broad planar surface, a second broad planar surface that is separated by the first broad planer surface by a first thickness, a first edge, a second edge opposite the first edge, a third edge, and a fourth edge opposite the third edge;

a second leaf, the second leaf having a third broad planar surface, and a fourth broad planar surface that is separated by the third planar surface by a second thickness;

the second leaf extending from first edge of the first leaf in a direction perpendicular to the first broad surface to form an L-shape with the first leaf;

a tab, the tab having a first tab planer surface, a second tab planer surface opposite the first tab planer surface; and wherein the tab is pivotally attached to first leaf or to the second leaf such that the tab pivots between a first position wherein the tab extends in a direction that is perpendicular to the second leaf and a second position wherein the tab extends in a direction that is parallel to the second leaf.

2. The article placeholder device of claim 1, further comprising:

a pair of stand-offs disposed on the second tab planer surface and longitudinally spaced from each other; and wherein when the tab is in the second position, the pair of stand-offs may contact the third broad surface to provide a space between the tab and the second leaf.

3. The article placeholder of claim 1, wherein the tab has a pair of longitudinally separated legs, and the tab is pivotally attached by pivotal connection at each leg.

4. The article placeholder of claim 1, wherein the first leaf is rectangular shaped.

5. An article placeholder device, comprising:

a first leaf, the first leaf having a first broad planar surface, a second broad planar surface that is separated by the first broad planer surface by a first thickness, a first edge, a second edge opposite the first edge, a third edge, and a fourth edge opposite the third edge;

a second leaf, the second leaf having a third broad planar surface, and a fourth broad planar surface that is separated by the third planar surface by a second thickness;

the second leaf extending from first edge of the first leaf in a direction perpendicular to the first broad surface to form an L-shape with the first leaf;

a tab, the tab having a pair of longitudinally separated legs, a first tab planer surface, a second tab planer surface opposite the first tab planer surface, a pair of stand-offs disposed on the second tab planer surface and longitudinally spaced from each other; and wherein the tab is pivotally attached to the first edge by a pivotal connection at each leg thereof such that the tab is able to pivot between a first position wherein the tab extends from the first edge in a direction that is perpendicular to the second leaf and a second position wherein the tab extends from the first edge in a direction that is parallel to the second leaf, and wherein in the second position, the pair of stand-offs may contact the third broad surface to provide a space between the tab and the second leaf.

6. An article placeholder device system, comprising:

a plurality of placeholders, each placeholder comprising a first leaf, the first leaf having a first broad planar surface, a second broad planar surface that is separated by the first broad planer surface by a first thickness, a first edge, a second edge opposite the first edge, a third edge, and a fourth edge opposite the third edge; a second leaf, the second leaf having a third broad planar surface, and a fourth broad planar surface that is separated by the third planar surface by a second thickness; the second leaf extending from first edge of the first leaf in a direction perpendicular to the first broad surface to form an L-shape with the first leaf; a tab, the tab having a first tab planer surface, a second tab planer surface opposite the first tab planer surface; and wherein the tab is pivotally attached to first leaf or to the second leaf such that the tab pivots between a first position wherein the tab extends in a direction that is perpendicular to the second leaf and a second position wherein the tab extends in a direction that is parallel to the second leaf;

each placeholder having a colored emblem and wherein at least two placeholders have differently colored emblems; and a plurality of file folders, each file folder having a colored emblem of a color that correspondence to a colored emblem of a placeholder.

7. The article placeholder device system of claim 6, wherein each placeholder further comprising:

a pair of stand-offs disposed on the second tab planer surface and longitudinally spaced from each other; and wherein when the tab is in the second position, the pair of stand-offs may contact the third broad surface to provide a space between the tab and the second leaf.

8. The article placeholder device system of claim 6, wherein the tab of each placeholder has a pair of longitudinally separated legs, and the tab is pivotally attached by pivotal connection at each leg.

9. The article placeholder device system of claim 6, wherein the first leaf of each placeholder is rectangular shaped.

10. The article placeholder device system of claim 6, wherein the colored emblem of each placeholder is an adhesive emblem and is attached to the tab.

11. The article placeholder device system of claim 6, wherein the colored emblem of each file folder is an adhesive emblem.

* * * * *